United States Patent [19]
Kelly

[11] Patent Number: 6,005,300
[45] Date of Patent: Dec. 21, 1999

[54] LIGHT HARNESS

[75] Inventor: Fred E. Kelly, Oakville, Canada

[73] Assignee: The Louis Berkman Company, Steubenville, Ohio

[21] Appl. No.: 09/159,035

[22] Filed: Sep. 23, 1998

[51] Int. Cl.⁶ .................................. B60L 1/00; B60Q 1/02
[52] U.S. Cl. ............................................. 307/10.1; 315/83
[58] Field of Search .................................. 315/82, 83, 90, 315/77; 307/10.1, 10.8, 9.1, 157; 362/20, 487, 496, 507, 543, 85, 254

[56] References Cited

U.S. PATENT DOCUMENTS

| | | |
|---|---|---|
| 4,280,062 | 7/1981 | Miller . |
| 4,781,393 | 11/1988 | Jeter . |
| 5,420,480 | 5/1995 | Knepel . |
| 5,703,411 | 12/1997 | Bella et al. ............................ 307/10.1 |
| 5,841,203 | 11/1998 | Chambers et al. ..................... 307/10.8 |

OTHER PUBLICATIONS

Meyer Snow Plow Lights, Form No. 1–696, Jul. 1996.
Meyer Snow Plow Lights, Form No. 1–696R, Mar. 1997.

*Primary Examiner*—Jeffrey Gaffin
*Assistant Examiner*—Roberto J. Rios
*Attorney, Agent, or Firm*—Vickers, Daniels & Young

[57] ABSTRACT

An auxiliary vehicle light harness which includes headlight connector to connect to a headlight, a power connector to connect to a headlight plug, an auxiliary light connector to connect to an auxiliary light, and a switch to control power to the headlight and/or the auxiliary light. The harness may include a control module to direct power to the auxiliary light and/or the headlight upon receiving a signal from the switch. The harness may further include a seal to protect the harness circuit from developing a short.

45 Claims, 8 Drawing Sheets

LIGHT HARNESS

BACKGROUND OF THE INVENTION

This invention relates to the art of exterior lighting for vehicles and, more particularly, to an auxiliary light and wiring arrangement for connecting the auxiliary light to a vehicle.

The present invention finds particular utility in connection with vehicles such as snow plows having an attached plow blade and, accordingly, is disclosed and described in detail hereinafter in connection with such use. However, it will be appreciated that the invention is applicable to other lighting and electrical connection uses.

Auxiliary lights are light sources utilized to supplement a vehicle's standard lighting. These lights are often used, for example, on snowplow vehicles and on off-road vehicles. The lights for these uses are designed to either mount on the frame of a snow plow or some other external component of the vehicle capable of supporting the light. Although the use of auxiliary lights is becoming popular for various types of vehicles and vehicle applications, the type of available lights and the wiring harness used to connect these auxiliary to the vehicle's existing electrical system have many inherent problems.

Existing auxiliary light designs commonly utilize a conventional sealed beam headlight within the auxiliary light housing assembly. Due to the size and weight of the conventional sealed beam auxiliary lights, such auxiliary lights are undesirably heavy, thereby requiring stronger and costlier housing materials and/or reinforcement of the components in the auxiliary light housing. These heavy auxiliary lights also limit the mounting locations on a vehicle and can result in increased incidents of damage to the light and/or vehicle when the vehicle is operated in harsh and/or off-road environments. Another problem with existing auxiliary lights is the design of such lights and the difficultly in replacing parts. Replacement of a sealed beam headlight varies in difficulty based on the structure, age and condition of the auxiliary lighting assembly. The removal of the cover plates and support thereof is difficult and time consuming. Dismounting of the auxiliary light can also be difficult since such lights do not include integral mounting components, thereby requiring an additional support member, a bezel, and/or other components to secure the light to the housing. The auxiliary lights typically include pads which provide cushioning and reduce vibration of the light components. The location and number of components of the auxiliary light make it difficult to access, remove, replace and reseal the auxiliary light components. Many of the problems associated with auxiliary lights are addressed and overcome by the improved auxiliary light disclosed in U.S. patent application Ser. Nos. 29/080,246, filed Dec. 5, 1997 and U.S. Pat. application Ser. No. 09/018,930, filed Feb. 5, 1998, both of which are incorporated herein by reference.

The wiring arrangements or harnesses for auxiliary light systems also have many problems. Traditionally, the auxiliary lights were spliced into the existing wiring for the headlights of the vehicle. The splicing of the existing wiring caused many problems. Wires which were not properly spliced together become loose resulting in the auxiliary lights and/or headlights to malfunction. Improperly spliced wires also resulted in electrical shorts which could damaged the electrical system of the vehicle and/or cause a malfunction with one or more electrical systems of the vehicle, including the headlights and/or auxiliary lights. The splicing of OEM wiring of the vehicle further resulted in the voiding of many of the warranties for the OEM wiring of the vehicle and/or headlights of the vehicle. The splicing of the auxiliary light system into the existing electrical system of the vehicle further made it difficult to connect and disconnect the auxiliary lights when the auxiliary lights needed to be repaired or were not needed. Such connecting and disconnecting also resulted in increased wear and damage to the spliced region of the vehicle electrical system thereby resulting in increased incidents of failure or malfunction of the vehicle electrical system.

In view of the problems associated with splicing auxiliary lights to the existing electrical system of a vehicle, auxiliary light harnesses were developed to eliminate the need to splice the OEM wiring to the headlights of a vehicle. One such electrical harness is disclosed in U.S. Pat. No. 4,280,062 issued to Richard R. Miller. The Miller harness connects the headlights of a vehicle and two auxiliary lights to a single existing vehicle plug that is connected to a vehicle headlight power source. The Miller harness requires the existing headlight wiring harness to be disconnected prior to using the harness. Therefore, when using the Miller harness, a portion of the OEM wiring of the vehicle is not used and can be discarded. Although the Miller harness overcomes some of the problems associated with splicing OEM wiring for the headlights of the vehicle, several problems exist when using the Miller harness.

The Miller harness is designed to connect two basic auxiliary lights to a vehicle's headlight power source. The Miller harness cannot be used with auxiliary lights that house emergency and/or turning signal lights along with the beam light. Consequently, the Miller harness is limited for use with only certain type of auxiliary lights. The Miller harness is designed to provide power to the vehicle headlights and/or the auxiliary lights from a single vehicle headlight power source. The current drawn on the single vehicle headlight power source during the operation of both headlights and/or auxiliary lights can result in an overload and/or damage to the wiring of the single vehicle headlight source caused by too much current being drawn through the wiring. The Miller harness, during installation, requires a cable containing at least six wires to be inserted through the fire wall of the vehicle so that a six pole switch can be mounted on or near the dashboard of the vehicle. Due to the large number of wires, a large hole must be drilled through the fire wall of the vehicle. Such size a hole can be difficult to form in the fire wall and can result in damage to the vehicle. The switch used in the Miller harness required six or more wires to be connected in a certain arrangement for the switch to operate properly. Improper connection of the wires to the switch results in a short in the harness which could cause damage and/or malfunction to the electrical system of the vehicle and/or damage to the headlights and/or auxiliary lights. In addition, due to the multiple wires connected to the switch of the Miller harness, it is difficult to locate a damaged or faulty wire to the switch and/or replace a wire to the switch. Shorting of the electrical system of the Miller harness and/or vehicle electrical system can occur during the use of the Miller harness. When using the Miller harness, only one of the vehicle headlight power sources is connected to the harness. The other vehicle headlight power source remains disconnected. During the operation of the vehicle, moisture, dirt, etc. can collect in the unused headlight power source and can cause a short during the operation of the vehicle. Furthermore, when the auxiliary headlights are disconnect from the Miller harness and the harness is not removed from the vehicle, the connectors for the auxiliary lights can collect moisture, dirt, etc. which can cause a short during the operation of the vehicle. The Miller harness also cannot be partially or totally detached and reattached in the vehicle without significant difficulty. When the Miller harness is to be repaired and requires the repaired portion to be removed from the vehicle, the complete harness must be removed from the vehicle. This requires the multiple wires to the switch to be pulled through the vehicle fire wall and out of the engine compartment without damaging the wires. When the Miller harness is to be reattached to the vehicle, the multiple wires must be inserted through the fire wall without damaging the wires and properly reattached to the switch.

In view of the deficiencies of prior auxiliary light harnesses, there is a need for an auxiliary light harness that can be used with a wide variety of auxiliary lights, which eliminates the need to splice the wiring to the headlights of a vehicle, which is easy to install in a vehicle, which reduces the occurrences of overloading the OEM wiring of the vehicle, which protects against shorting of an electrical circuit, which one or more components of the harness can be easily detached and reattached to the vehicle, and which components of the harness can be easily accessed for easy repair and/or replacement.

SUMMARY OF THE INVENTION

An auxiliary light harness in accordance with the present invention overcomes the foregoing and other problems heretofore encountered in connection with the use of prior auxiliary light harnesses. The auxiliary light harness incorporates a simple modular design that simplifies the installation of the auxiliary light harness and improves the safety and reliability of the auxiliary harness.

In accordance with a principle feature of the present invention, there is provided an auxiliary light harness for connecting auxiliary headlights such as snow plow lights to the OEM wiring of a vehicle and will be describe with particular reference thereto; however, the invention has broader applications and can be use to connect many types of auxiliary electrical systems and lights to the OEM wiring of a vehicle, aircraft, boat, train, trailer, building, etc.

In accordance with another feature of the present invention, the auxiliary light harness includes electrical connectors designed to connect to the OEM wiring of a vehicle headlight and to the OEM wiring for the power source of the vehicle headlight. The vehicle headlights include a connector which can be attached to the power source of a vehicle. The auxiliary light harness of the present invention is designed to have two connectors whereby one of the connectors is connected to the vehicle headlight, and the other connector is connected to the power source to which the vehicle headlight was originally attached. Consequently, the auxiliary harness design utilizes all of the OEM wiring of a vehicle and none of the OEM wiring of the vehicle is discarded or only partially utilized when the auxiliary light harness is attached to the vehicle.

In accordance with still another feature of the present invention, the auxiliary light harness is designed to be integrated with the turning signals and/or emergency lighting of the vehicle. In this regard, auxiliary headlights which are attached to the vehicle and include turn signals and/or emergency lighting can be attached to the auxiliary harness so that such turning signals and/or emergency lights are activated when the operator of the vehicle activates such turning signals and/or emergency lights. As a result, the auxiliary light harness can connect a variety of auxiliary lights to the vehicle.

In accordance with still another feature of the present invention, the auxiliary light harness includes circuitry which reduces the complexity of installation, operation, maintenance and repair of the auxiliary light harness. In one preferred design, the auxiliary light harness includes solid state circuitry which controls the activation and deactivation of the auxiliary lights. The solid state circuitry increases the reliability of the auxiliary light harness circuitry and reduces the number of wires needed to connect the auxiliary light harness to the OEM wiring of the vehicle. The solid state circuitry also reduces the number of wires which must be threaded through the fire wall of a vehicle into the auxiliary lighting switch located in the operator driving compartment. The reduced number of wires needed for the switch and the overall circuitry of the auxiliary light harness greatly simplifies the installation, maintenance, reliability and repair of the auxiliary light harness.

In accordance with still yet another feature of the present invention, the auxiliary light harness is designed to be a modular unit which allows the auxiliary lights to be easily detached and removed from the vehicle without having to dismantle and remove the complete auxiliary light harness from the vehicle. This modular design of the auxiliary light harness also allows for components of the auxiliary light harness to be easily removed and replaced when in need of repair or replacement without having to completely remove or dissemble the auxiliary light harness from the vehicle.

In accordance with another feature of the present invention, the auxiliary light system is connected to the vehicle power source in a manner as to reduce the occurrences of the auxiliary lights inadvertently draining the power of the vehicle's battery. Preferably, the auxiliary light harness is connected in series to the ignition switch of the vehicle such that the ignition switch must be activated prior to the auxiliary lights being activated. When the ignition switch of the vehicle is activated, the vehicle's engine is typically running, thereby supplying sufficient power to the vehicle. During the operation of the engine, the activation of the auxiliary light system can be activated without draining the battery power of the vehicle.

In accordance with still yet another feature of the present invention, the auxiliary light harness can be designed to allow the vehicle's headlights or the auxiliary lights of the vehicle to be activated; or allow both the auxiliary lights and the headlights of the vehicle to be activated. When the auxiliary light harness is used to attach snowplow lights to a vehicle, the headlights of the vehicle are typically deactivated when the snowplow lights are activated since the snowplow blade typically obstructs the light from the headlights. Therefore, it is desirable to deactivate the headlights of the vehicle upon activation of the plow lights so as to preserve the life of the vehicle headlights. In other applications wherein the auxiliary lights are fog lights, it is desirable to have both the fog lights and the headlights simultaneously activated to increase the number of lumens generated by the vehicle.

In accordance with another feature of the present invention, the auxiliary light harness incorporates special connectors to ensure that the connectors will not inadvertently become disconnected during operation. Preferably, the connectors include a lock system such as a snap lock, which ensures that the connectors are properly secured together and to further prevent the connections from loosening or becoming disconnected during the operation of the vehicle. The connectors are also preferably designed to allow the connectors to be connected in only one manner, so as to prevent an improper connection. In this manner, the connectors are specially shaped so that the connectors can only be attached together in one manner.

In accordance with yet another feature of the present invention, the auxiliary light harness includes a seal arrangement to prevent foreign materials from damaging and/or causing a short in the circuitry of the auxiliary light harness. Preferably, the connectors utilized in the auxiliary light harness include seals that inhibit and/or prevent liquid, dust, dirt and/or other debris from contacting the electrical connections of the auxiliary light harness. In one preferred design, the connectors include rubber, plastic, and/or Teflon seals to prevent foreign materials from interacting with the electrical connections of the vehicle light harness. The seals help prevent corrosion of the electrical connections, bad connections between the electrical connections, shorting of the electrical connections and the like.

In accordance with another feature of the present invention, the connectors include plugs which are utilized when the auxiliary lights are disconnected and removed from the vehicle. After the auxiliary lights are disconnected from the auxiliary light harness, the electrical connectors of the auxiliary light harness are exposed to the environment. The connector plugs are designed to connect to the ends of these electrical connections to seal the electrical connections from the environment, thereby inhibiting and/or preventing corrosion of the electrical connections, and/or other debris from depositing on the electrical connections which may impair the operation of the auxiliary light harness when the auxiliary lights are once again attached to the harness. Preferably, these plugs are also used for the ends of the connectors on the auxiliary light harness that connect to the auxiliary light connectors so as to also prevent corrosion and/or debris depositing on and/or in the electrical connections while the auxiliary lights are being stored.

It is accordingly a principal object of the present invention to provide an improved auxiliary light harness to be used in conjunction with a vehicle which is simple to install and operate.

Another object of the present invention is the provision of an auxiliary light harness which can be used with a wide variety and style of auxiliary lights.

Still another object of the present invention is the provision of an auxiliary light harness which utilizes the OEM wiring of a vehicle headlight system without the need to splice the OEM wiring to the vehicle headlights.

Yet another object of the present invention is the provision of an auxiliary light harness which utilizes all of the OEM wiring for the headlight system of a vehicle.

Still yet another object of the present invention is the provision of an auxiliary light harness which reduces the occurrence of overloading the OEM wiring of the vehicle during the operation of the auxiliary lights.

Another object of the present invention is the provision of an auxiliary light system which protects against the shorting and/or damage of the electrical system of the auxiliary light harness.

Still another object of the present invention is the provision of an auxiliary light harness which allows for one or more of the components of the harness to be easily attached and reattached to the vehicle without having to substantially remove the harness from the vehicle.

Yet another object of the present invention is the provision of an auxiliary light system which can be easily maintained and repaired.

Still yet another object of the present invention is the provision of an auxiliary light system which reduces the occurrences of the components of the harness being incorrectly connected together.

Still a further object of the present invention is the provision of an auxiliary light system which reduces the occurrence of components becoming inadvertently disconnected during the operation of the vehicle.

Another object of the present invention is the provision of an auxiliary light harness which includes a modular design that simplifies the installation, repair, maintenance and operation of the auxiliary lights on a vehicle.

Yet another object of the present invention is the provision of an auxiliary light harness which reduces the occurrence of inadvertent power drain of a vehicle's battery during the operation of the auxiliary lights.

Yet still another object of the present invention is the provision of an auxiliary light harness which includes solid state circuitry to improve the reliability and simplicity of operation, maintenance, installation, and repair or the auxiliary vehicle light harness.

Another object of the present invention is the provision of an auxiliary light harness that includes a sealing arrangement to reduce degradation of the electrical circuitry and/or interface with electrical connections.

These and other objects and advantages will become apparent from the following description used to illustrate the preferred embodiment of the invention when read in conjunction with the accompanying drawings.

DESCRIPTION OF THE PREFERRED EMBODIMENT

Figure 1:
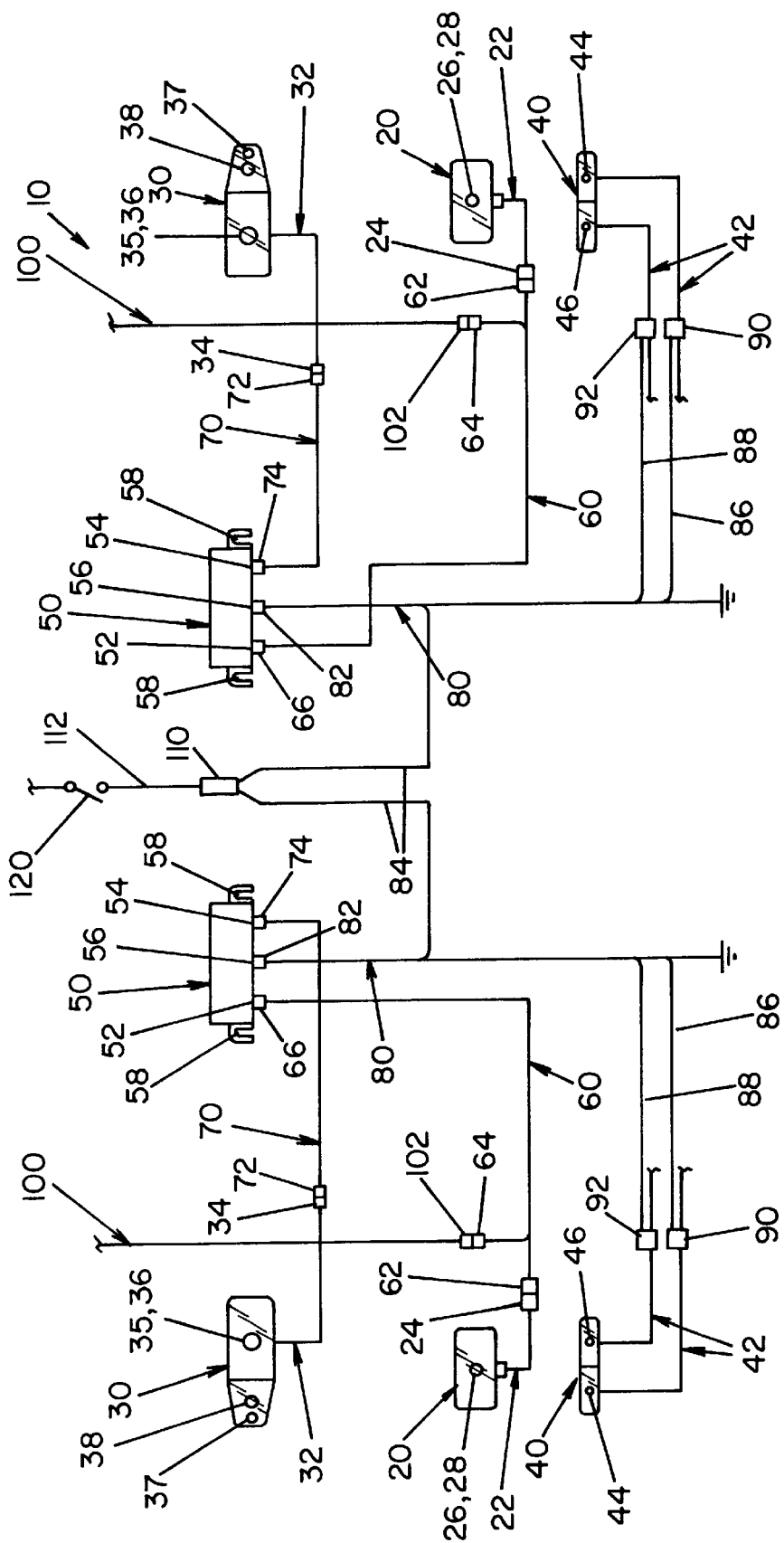
FIG. 1 is a schematic view of the auxiliary light harness and components attached thereto in accordance with the present invention.
Figure 2:
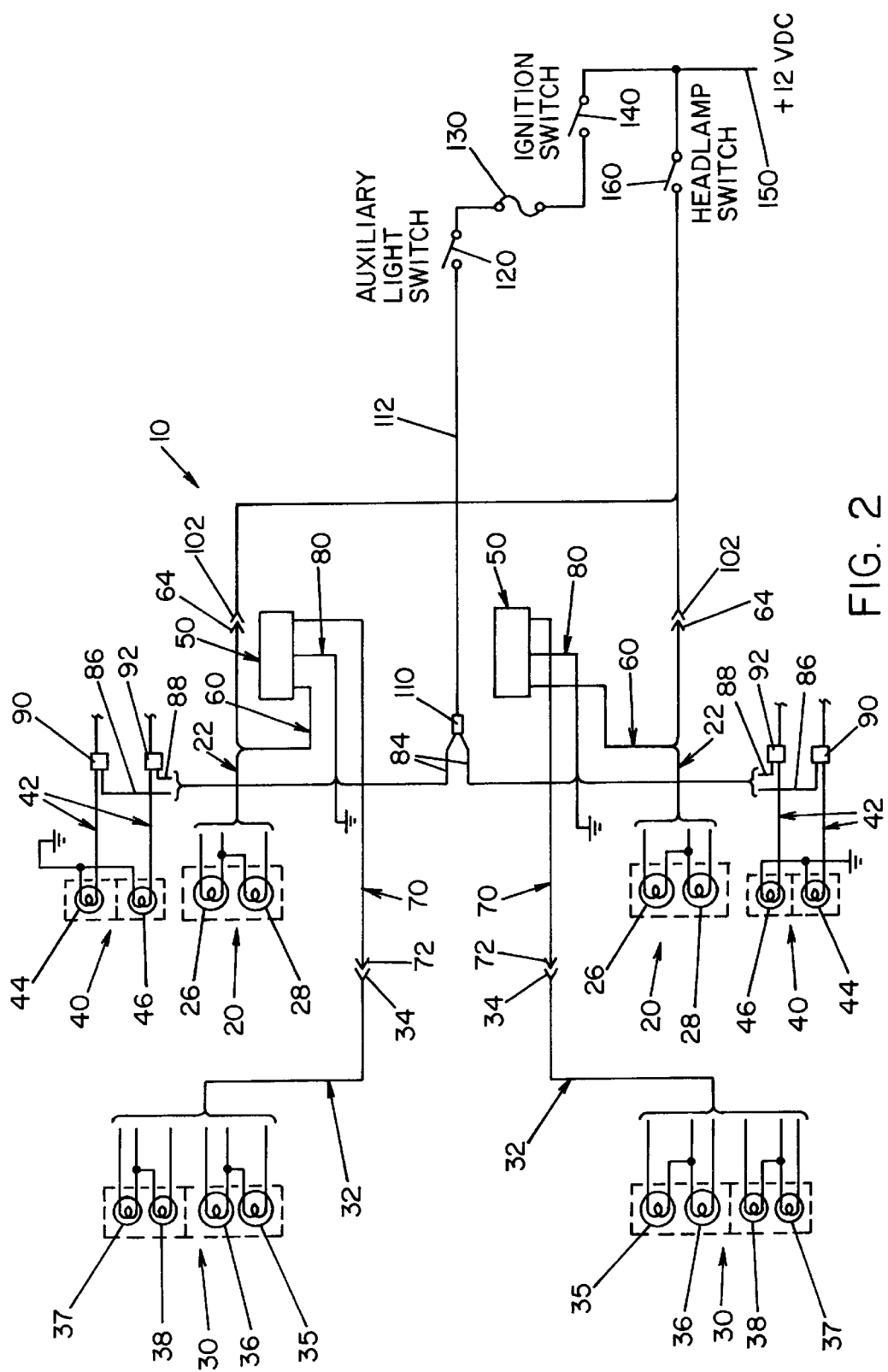
FIG. 2 is an electrical schematic drawing of the auxiliary light harness illustrated in FIG. 1.

Referring now to the preferred embodiment of the drawings, wherein the showings are for the purpose of illustrating a preferred embodiment of the invention only and not for the purpose of limiting the invention, FIGS. 1 and 2 are schematic drawings of the auxiliary light harness 10 in accordance with the present invention. Auxiliary harness 10 is designed to electrically connect auxiliary lights 30 to the electrical system of a vehicle. As specifically illustrated in FIGS. 1 and 2, auxiliary lights 30 are auxiliary headlights 35 and 36 which are electrically connected to the headlight electrical circuitry of a vehicle.

In a typical vehicle, the vehicle includes two headlights 20 wherein each of the headlights includes wiring 22 which electrically connects to the light in the headlight at one end and includes a connector 24 at the other end. Headlight wire connector 24 is electrically connected to the OEM headlight wiring 100 of the vehicle. Specifically, connector 24 connects to connector 102 of the OEM headlight wiring. The vehicle also typically includes a turn/emergency light 40 which has a turn emergency light 44 and a park light 46. Wiring 42 connects turn light 44 and park light 46 to the OEM light wiring of the vehicle.

Auxiliary light harness 10 is designed to connect to the headlight wiring connectors, turn and emergency light wiring and to the OEM headlight wiring connectors. Once the auxiliary light harness 10 is properly connected to the electrical system of a vehicle, all the OEM wiring to the headlights of the vehicle is operational and used by the harness.

Referring specifically to FIG. 1, the auxiliary light harness is connected to the OEM headlight wiring of the vehicle and to the turn light and emergency light wiring of the vehicle. When the auxiliary light harness 10 is installed, headlight wiring connector 24 is disconnected from OEM headlight wiring connector 102. Harness headlight wiring connector 62 is then connected to the headlight wiring connector 24. Furthermore, harness headlight power connector 64 is connected to OEM headlight wiring connector 102. Connectors 62 and 64 are part of harness headlight wiring 60 which connects to a harness control module 50. Harness headlight wiring 60 includes a port connector 66 which connects to module headlight port 52 of control module 50. As illustrated in FIG. 1, each set of auxiliary light 30 and headlight 20 has its own harness control module 50. Typically, harness 10 will only include two harness control modules since most vehicles typically have only two headlights.

Auxiliary light 30 includes auxiliary light wiring 32 which connects at one end to the lights in auxiliary light 30 and at the other end includes a wiring connector 34. Wiring connector 34 is connected to harness auxiliary light connector 72 which in turn is connected to one end of harness auxiliary light wiring 70. At the other end of auxiliary light wiring 70 is a port connector 74 which connects to auxiliary light port 54 of control module 50.

Turn light/emergency light 40 are electrically connected to OEM wiring. Harness switch wiring 80 includes two wires 86, 88 which connect to wiring 42 by connectors 90, 92. The electrical connectors can take any form which creates an electrical connection between turn/emergency light wiring 42 and turn light wire 86 and emergency light wire 88. Preferably, the connectors are electrical splices. Harness switch wiring 80 is connected to include a port connector 82 which connects to module switch port 56 of control module 50. Harness switch wiring 80 also includes a ground connection and switch wire 84.

As shown in FIG. 1, the switch wires 84 from each of the two control modules 50 are connected together by switch wire connector 110. The other end of switch wire connector 110 is connected to a switching wire 112 which terminates at one end of auxiliary light switch 120.

The auxiliary headlights 30 can be a variety of different styles and types of headlights. One preferable type of auxiliary headlight is disclosed in the assignee's U.S. patent application Ser. No. 29/080,246, filed Dec. 5, 1997 and U.S. patent application Ser. No. 09/018,930, filed Feb. 5, 1998.

The manner in which the auxiliary headlights can be connected to the vehicle will depend on the style and type of the vehicle and the style and type of auxiliary headlight. One preferable arrangement for mounting the auxiliary headlight is disclosed in assignee's U.S. patent application Ser. Nos. 29/080,246 and 09/018,930.

As illustrated in FIG. 1, control module 50 includes a module mount hole 58. Mount hole 58 is designed to allow the control modules to be secured in the interior of a vehicle by bolts, screws or the like. Preferably, the control module 50 is mounted near each headlight of the vehicle. As can be appreciated, the wiring for the electrical harness may be secured by ties, clamps and the like to ensure that the wiring is secured in place during the operation of the vehicle.

Referring now to FIG. 2, a more detailed diagram of how the headlights, turn lights, emergency lights, and auxiliary lights are electrically connected to auxiliary wire harness 10 is illustrated. In particular, auxiliary light switch 120 is connected in series to the vehicle ignition switch 140. By connecting the auxiliary light harness 10 in such fashion, auxiliary lights 30 cannot be activated before the ignition switch of the vehicle is engaged. This connection arrangement is different from the vehicle headlight switch 160 connection wherein headlights 20 can be activated independently of the engagement of ignition switch 140. As can be appreciated, auxiliary lights 30 are prevented from draining the power from the vehicle battery. This arrangement is very beneficial in that the auxiliary lights 30 typically draw substantially more power than standard headlights, and thus can drain a vehicle's battery in a substantially shorter time than the vehicle's headlights. However, after an operator activates the ignition switch of the vehicle thereby causing the vehicle engine to run, the power generated by the engine is more than sufficient to power the auxiliary lights, thus preventing the power drain of the vehicle battery by the auxiliary lights.

Figure 3:
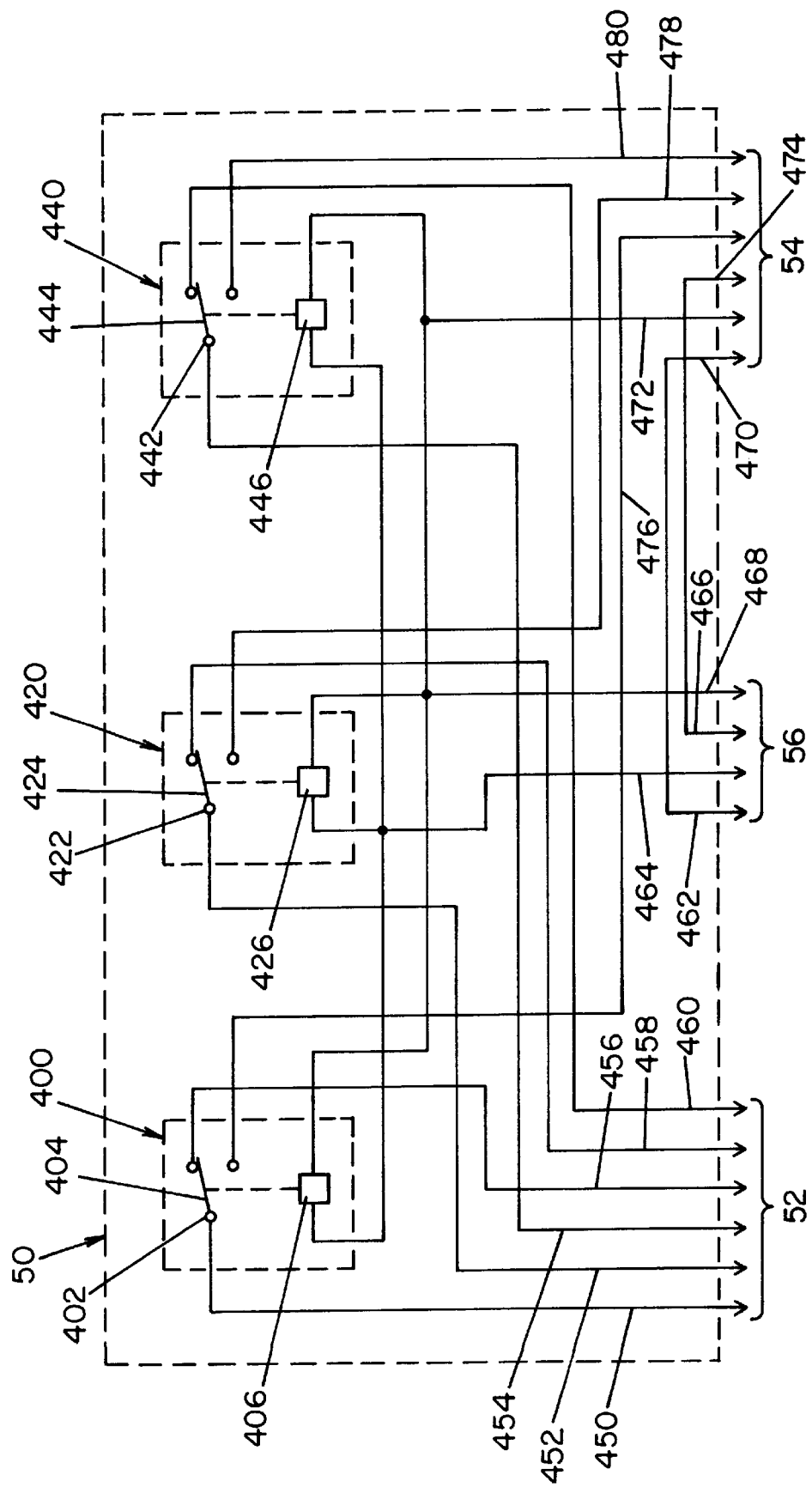
FIG. 3 is an electrical schematic drawing of a circuit used in the electrical auxiliary light harness in FIG. 1.
Figure 4:
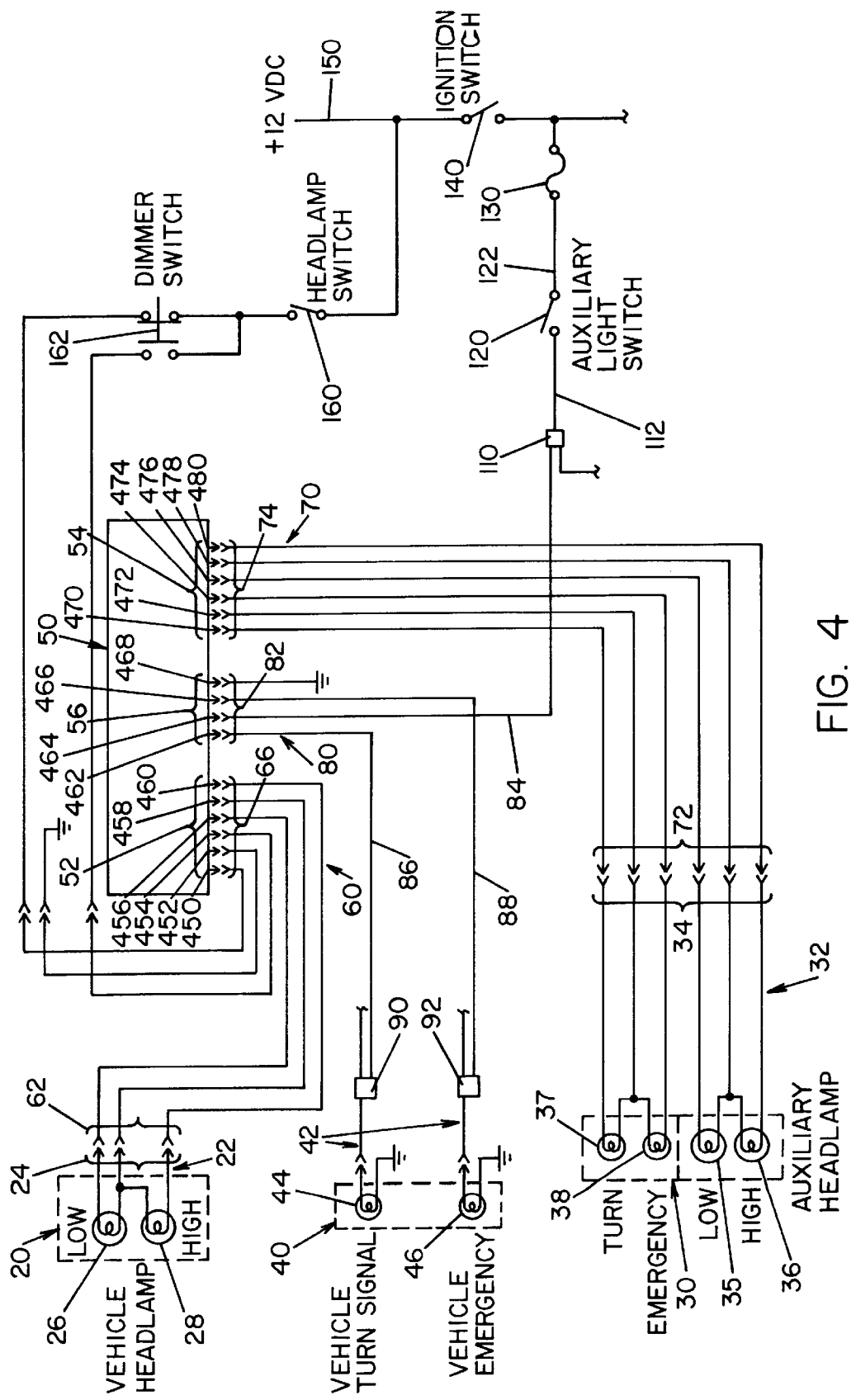
FIG. 4 is a electrical schematic drawing illustrating the circuit of FIG. 3 controlling one vehicle headlight and one auxiliary headlamp.

Referring now to FIGS. 3 and 4, a more detailed electrical diagram of the auxiliary light harness 10 is illustrated. In FIG. 4, a detailed electrical connection arrangement for the switch wire is illustrated. Switching wire 112 is shown to be connected to one end of auxiliary light switch 120. The other end of auxiliary light switch 120 is connected by a light switch wire 122 to a fuse box 130 of a vehicle. The specific fuse selected is to be in series with ignition switch 140 of the vehicle so as to prevent current from passing through switching wire 112 until both auxiliary light switch 120 and ignition switch 140 are activated.

FIG. 4 also illustrates a standard dimmer switch 162 connected in series with headlamp switch 160. Dimmer switch 162 is used to activate the low beam light 26 and the high beam light 28 of headlight 20 and the low beam light 35 and high beam light 36 of auxiliary light 30.

As illustrated in both FIGS. 3 and 4, control module 50 is designed to activate the auxiliary lights 30 and deactivate headlights 20 of a vehicle when auxiliary light switch 120 and ignition switch 140 are activated. When ignition switch 140 and/or auxiliary light switch 120 are deactivated, headlights 120 are automatically reactivated and auxiliary lights 30 are automatically deactivated. Control module 50 can be designed to allow the vehicle's headlights to remain activated when the auxiliary lights of the vehicle are activated. As a result, auxiliary lights 30 and/or the vehicle's headlights can be activated and deactivated by a light selection switch which includes auxiliary light switch 120 and/or ignition switch 140.

As shown in FIG. 4, switch wire 84 receives current from power source 150 when both ignition switch 140 and auxiliary light switch 120 are activated. Switch wire 84 transfers such current to control module 50 through the module switch port. Referring specifically to FIG. 3, wire 464 is connected to the switch wire at the module switch port. Wire 464, 468 and 472 are electrically connected to three solid state switches 400, 420 and 440 contained in harness control module 50. Specifically, wire 464 is connected to switch controllers 406, 426 and 446 of solid state switches 400, 420 and 440, respectively. The solid state switches illustrated in FIG. 3 are schematic representations of any of a number of a type of solid state switches. Preferably, the solid state switch is a transistor, magnetic switch or similar electrical switching device. When current passes through wire 464 and into switch controllers 406, 426 and 446, the switch controllers cause switch blades 404, 424 and 444 to connect to wires 476, 478 and 480, respectively. When current ceases to pass through wire 464, switch controllers 406,426 and 446 cause switch blades 404,424 and 444, connected to terminals to move back into their original positions so as to once again be engaged with wires 456, 458 460, 450, 452, and 454, respectively.

Referring to both FIG. 3 and FIG. 4, the operation of control module 50 of auxiliary light harness 10 will be briefly described. Auxiliary light harness 10 is designed such that when auxiliary light switch 120 and/or ignition switch 140 are not switched on, the solid state switches and control module 20 are in their initial contact position. In such a position, the headlights 20 of the vehicle operate in their standard manner, and the auxiliary lights 30 are deactivated. In this mode of operation, the headlights 20 of the vehicle operate in their standard fashion along with the operation of the turn/emergency lights 40 of the vehicle. When the operator activates the ignition switch 140 by turning on the vehicle and also activating auxiliary light switch 120, which is typically located in the driving compartment of the vehicle, current is directed through switch wire 84 into control module 50. The current passing through switch wire 84 in turn causes the solid state switches in the control module 50 to move to the activated position. In such a position, the power to the vehicle's headlights is rerouted to the auxiliary lights 30 of the vehicle. This rerouting of power causes the headlights of the vehicle to become deactivated and the auxiliary lights 30 to become activated.

As can be appreciated, when headlight switch 160 is deactivated, the headlights 20 of the vehicle are off, since no power is connected to the headlights. In addition, when headlamp switch 160 is deactivated, the auxiliary lights 30 cannot be activated since headlight switch 160 continues the power flow through OEM wiring 100. Consequently, the auxiliary lights 30 cannot be activated until headlight switch 160, ignition switch 140 and auxiliary switch 120 are all activated at the same time. The wiring of the control module 50 is designed such that the signal caused by dimmer switch 162 is received by auxiliary lights 30 the same as when the headlights 20 are activated. Consequently, dimmer switch 162 controls the low beam light 35 and the high beam light 36 of auxiliary light 30 in a similar manner as when dimmer switch 162 controls the low beam light 26 and the high beam light 28 of headlight 20. Auxiliary light harness 10 also routes power from turn/emergency light wiring 42 to auxiliary light 30. However, unlike the circuitry between the vehicle headlights and the auxiliary lights, auxiliary light harness 10 does not deactivate the vehicle's turn signals or the vehicle's emergency lights when the auxiliary lights are activated. As shown in the circuit diagrams of FIGS. 3 and 4, when the vehicle turn signal and/or the vehicle emergency light is activated, harness turn light wire 86 and harness emergency light wire 88 route such signals from turn/emergency light wiring 42 through harness control module 50 and into auxiliary turn emergency light 37 and auxiliary park light 38 of auxiliary 30 to thereby cause such lights to activate simultaneously with the vehicle's turn light 44 and/or park light 46.

Referring now to FIG. 1, auxiliary light harness 10 has a modular design in that the various components can be connected, replaced, and/or repaired without having to completely dissemble and/or remove the harness from the vehicle. The solid state construction of the control module simplifies the wiring of the electrical harness, and ensures the desired operation of the headlights of the vehicle and the auxiliary lights of the vehicle occurs during an emergency or some unforeseen circumstance. The reduced number of wires through the fire wall of the vehicle and into the driving compartment of the vehicle also simplifies installation of the harness, and simplifies and reduces the time for maintenance and repair of the vehicle, and further reduces unnecessary damage to the vehicle. As shown in FIG. 1, switching wire 112 is a single wire that connects to switch 120. Consequently, only a small hole is needed through the fire wall of the vehicle to connect switch wire 112 to switch 120, thus significantly simplifying installation and repair of the auxiliary light harness. Switch 120 preferably includes an indicator, such as a light, to notify a vehicle operator of the position of switch 120. As can be appreciated, the majority of the wiring of the harness, the control modules and the harness and the switch of the harness can remain in the vehicle from season to season, even though the auxiliary lights are periodically removed, reinstalled and/or replaced on the vehicle. This can be accomplished by simply disconnecting auxiliary light connector 34 from harness auxiliary light wire connector 72 and dismounting the auxiliary light from the vehicle. When the auxiliary light once again is to be reinstalled, connector 34 of the auxiliary light is simply reconnected to the harness auxiliary light connector 72.

Figure 6:
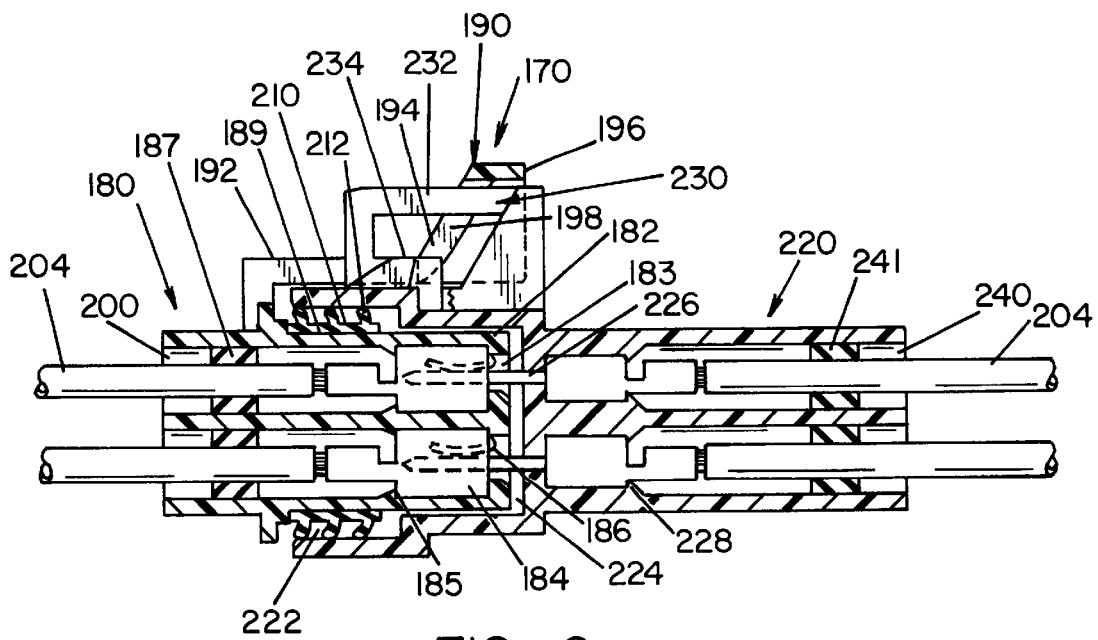
FIG. 6 is a cross sectional view along line 6—6 of FIG. 5.
Figure 7:
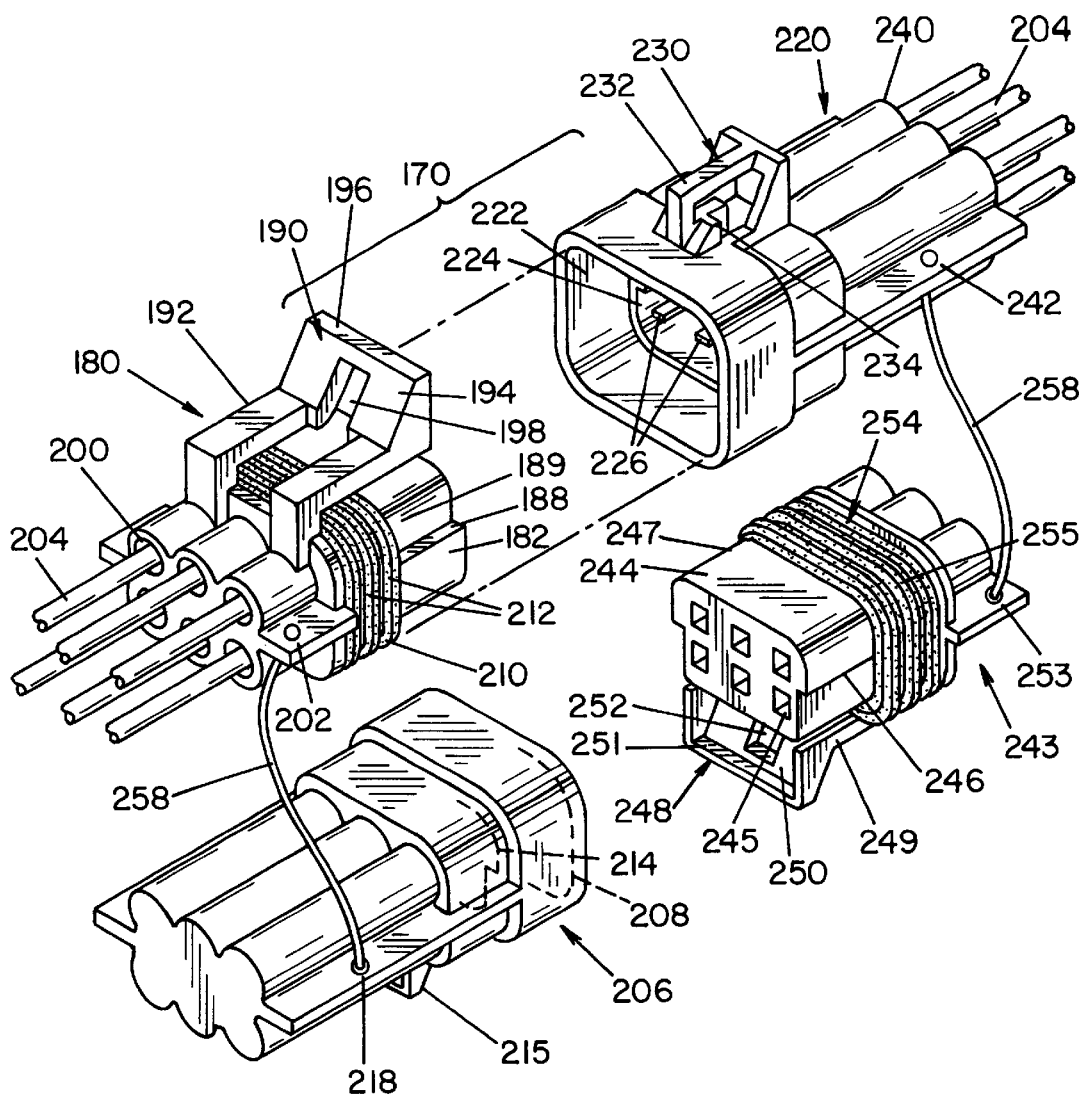
FIG. 7 is a detached perspective view of two connectors in accordance with the invention.

The integrity of the auxiliary light harness 10 is maintained by several seals which are utilized at the connections with the control module and with the connection between the auxiliary light connector 34 and harness headlight connector 62. As can be appreciated, a similar seal construction can be created for harness headlight power connector 64 and OEM light wiring connector 102. Referring now to FIGS. 5–8, a seal connector 170 is illustrated. Seal connector 170 includes a male connector 180 and a female connector housing 220. As best shown in FIGS. 6 and 7, male connector housing 180 includes a neck portion 182 designed to be telescopically inserted into female connector housing 220. At the front end of neck portion 182 is a plurality of neck openings 183. Positioned inside of each of the neck openings is a conductor socket 184. Each conductor socket 184 is secured in place by a socket lock tab 185. Each conductor socket includes a socket contact 186 designed to engage a conducting pin when positioned in female connector housing 220.

The neck portion 182 of male connector housing 180 includes one or more neck ridges 188. These neck ridges define a particular shape of the outer surface of the neck portion so as to only allow the neck portion to be inserted in one specific manner into female connector housing 220 so as to ensure the proper electrical connection between the male connector housing 180 and the female connector housing 220.

Neck portion 182 also includes a seal surface 189 which supports a seal 210. Seal 210 includes a plurality of seal ribs 212. Seal 210 is designed to create a seal between neck portion 182 of male connector housing 180 and female connector housing 220 when the neck portion is telescopically inserted into female connector housing 220. The seal prevents and/or inhibits liquids, dust, dirt and the like from coming into contact with the conducting sockets 184 in male connector housing 180 and conductor pins 226 in female connector housing 220. The seals inhibit and/or prevent the conductor sockets and the conductor pins from corroding or allowing foreign materials to interfere with the electrical connection between the conducting sockets and the conductor pins when the male and female connector housings are connected together.

Positioned adjacent to the rear of neck portion 182 of male connector housing 180 is a lock latch 190. Lock latch 190 includes two latch arms 192. Connected between the two latch arms is a latch handle 194. The latch handle 194 includes a handle bar 196 and a slot 198. Latch arms 192 are made of material which is flexible to allow the latch handle to be lifted.

The rear of male connector housing 180 includes a plurality of connector rear openings 200. The openings are sized to allow wire 204 to pass through the openings. Wire seal 187 seals wire 204 within rear opening 200 so as to inhibit and/or prevent liquids, dust, dirt and the like from entering the rear opening and corroding and/or interfering with the electrical connections with conducting socket 184.

A security cable opening 202 is positioned adjacent to the rear openings of the male connector housing. Security cable opening 202 is designed to receive security cable 258.

Connected to the other end of security cable 258 is male seal connector 206. Male seal connector 206 includes a connector cavity which is designed to receive neck portion 182 and seal 210 on male connector housing 180. Inside connector cavity 208 is a positioning cavity 214 which is designed to allow neck portion 182 to be inserted into connector cavity 208 in only the proper manner. Male seal connector 206 also includes a lock tab 215. Connected to lock tab 215 is a tab guide 216 and a tab landing 217. Male seal connector 206 also includes a security cable opening 218 which receives the second end of security cable 258.

Female connector housing 220 includes a connector cavity 222 at the front of the female connector housing. Connector cavity 222 has a cross sectional shape and size which is designed to receive neck portion 182 of male connector housing 180. Within connector cavity 222 is a positioning cavity 224. Positioning cavity 224 is sized and shaped to specifically telescopically receive a portion of neck portion 182 such that male connector hosing 180 can only be connected to female connector housing 220 in a certain manner.

Also positioned within connector cavity 222 are a plurality of conducting pins 226. Each conducting pin 226 is secured within female connector housing 220 by pin lock tabs 228.

The top of female connector housing 220 includes a lock tab 230. Lock tab 230 includes a tab guide 232 which is adapted to slide through handle slot 198 on male connector housing 180 when male connector housing 180 is telescopically inserted into connector cavity 222 of female connector housing 220. Lock tab 230 also includes a tab landing 234 which engages a portion of latch handle 194 on male connector housing 180 to secure male connector housing 180 and female connector housing 220 together once male connector housing 180 is fully inserted in female connector housing 220.

The rear of female connector housing 220 includes a plurality of connector rear openings 240. Latch handle 194 can be lifted to be disengaged from the landing 234 to allow male and female connector housings to be disengaged from one another. Positioned in each of the rear openings is a wire 204 which connects to the end of conductor pins 226. Wire seal 241 seals the space between wire 204 and rear opening 240 to prevent liquids, dust, dirt and the like from corroding and/or interfering with the electrical connection between conducting pin 226 and conducting sockets 184.

Positioned adjacent to connector rear openings 240 is a security cable opening 242. Security cable opening 242 receives one end of security cable 258. The second end of security cable 258 is connected to security cable opening 253 of female seal connector 243.

Female seal connector 243 includes a neck portion 244 which is designed to be telescopically inserted into connector cavity 222 of female connector housing 220. The front of female seal connection 243 includes a neck portion 244. At the front end of neck portion 244 is a plurality of neck openings 245 which are designed to receive conducting pin 226 within connector cavity 222 of female connector housing 220 when female seal connector 243 is inserted into connector cavity 222. Neck portion 244 of female seal connector 243 includes a neck ridge 246. Neck ridge 246 is designed to provide neck portion 244 with a distinct cross sectional shape such that female seal connector 243 can only be inserted one way into connector cavity 222, to thereby ensure the proper insertion of female seal connector 243 into female connector housing 220. One portion of the neck portion 244 includes a seal surface 247. Seal 254 is positioned on seal surface 247. Seal 254 includes a plurality of seal ribs 255 which are designed to create a seal between neck portion 244 and the inner surface of connector cavity 222 to inhibit and/or prevent liquids, dust, dirt and the like from corroding and/or otherwise damaging or interfering with electrical connections provided by conductor pins 226. Female seal connector 243 includes a lock latch 248. Lock latch 248 includes two flexible latch arms 249 and a latch handle 250 connected therebetween. Latch handle 250 includes a handle bar 251 and a handle slot 252.

Figure 5:
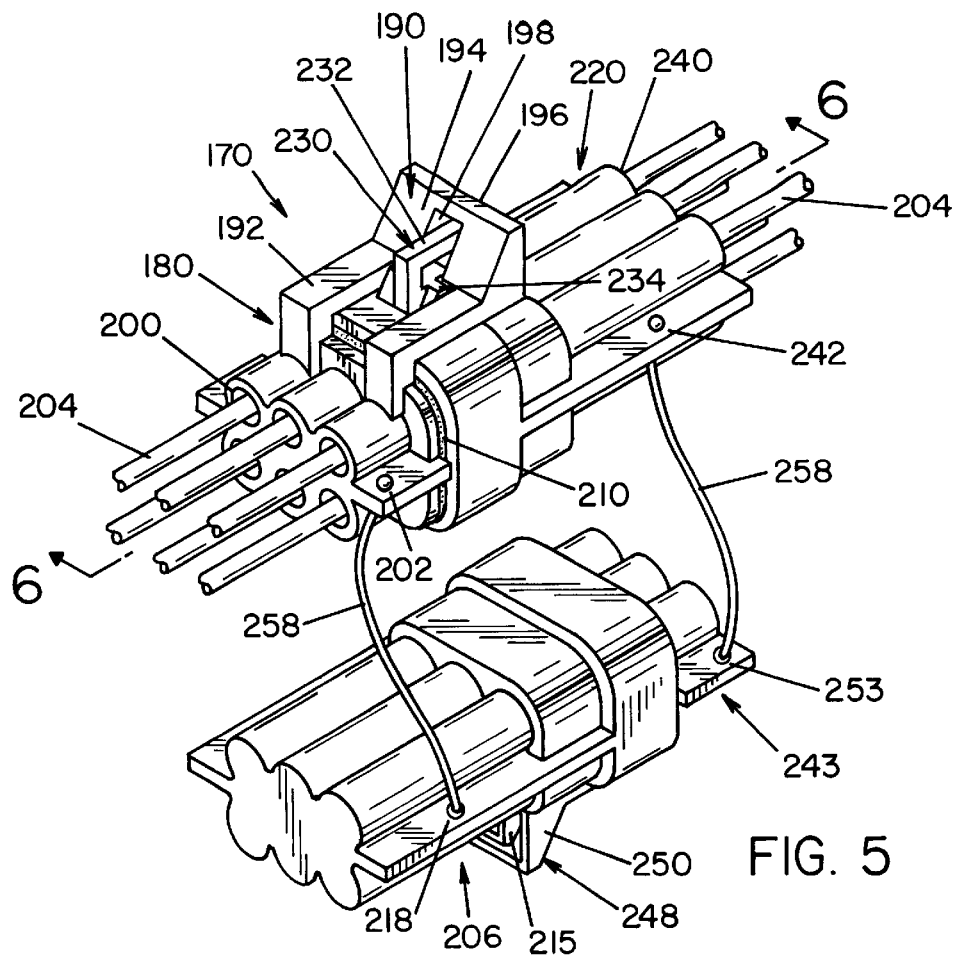
FIG. 5 is a perspective view of a connector and a connector plug in accordance with the invention.

As illustrated in FIGS. 5 and 7, male connector housing 180 includes a corresponding male seal connector 206 which is attached to the male connector housing 180 by a security cable 258. In addition, female connector housing 220 includes a female seal connector 243 which is connected to female connector housing 220 by a security cable 258. As specifically illustrated in FIGS. 5 and 6, male connector housing 180 and female connector housing 220 provide a secure and sealed electrical connection when such connectors are connected together.

As best shown in FIG. 5, the bottom portion of latch handle 194 of lock latch 190 on male connector housing 180 engages tab landing 234 on female connector housing 220 thereby securing female connector housing and male connector housing together. As shown in FIG. 6, when male connector housing 180 and female connector housing 220 are connected together, conducting pins 226 electrically engage with the corresponding conducting sockets 184 thereby forming the desired electrical connection. Seals 187, 210 and 241 ensure that liquids, dust, dirt and the like are inhibited and/or prevented from entering the interior components of the connectors so as to prevent such materials from damaging the conducting pins and/or conducting sockets while female connector housing and male connector housing are connected together. As shown in FIG. 5, male seal connector 206 and female seal connector 243 may also be connected together when male connector housing 180 is connected to female connector housing 220.

Referring now to FIG. 6, seal 210 includes a plurality of ribs 212 which contact the interior surface of conductor cavity 222 to form the seal between neck portion 182 of male connector housing 180 and conductor cavity 222 of female connector housing 220. Seal 210 is preferably made of a flexible plastic material, flexible rubber material or other flexible material which allows seal ribs 212 to compress and/or flex when such seal ribs contact the interior of connector cavity 222 to thereby provide the desired seal.

Figure 8:
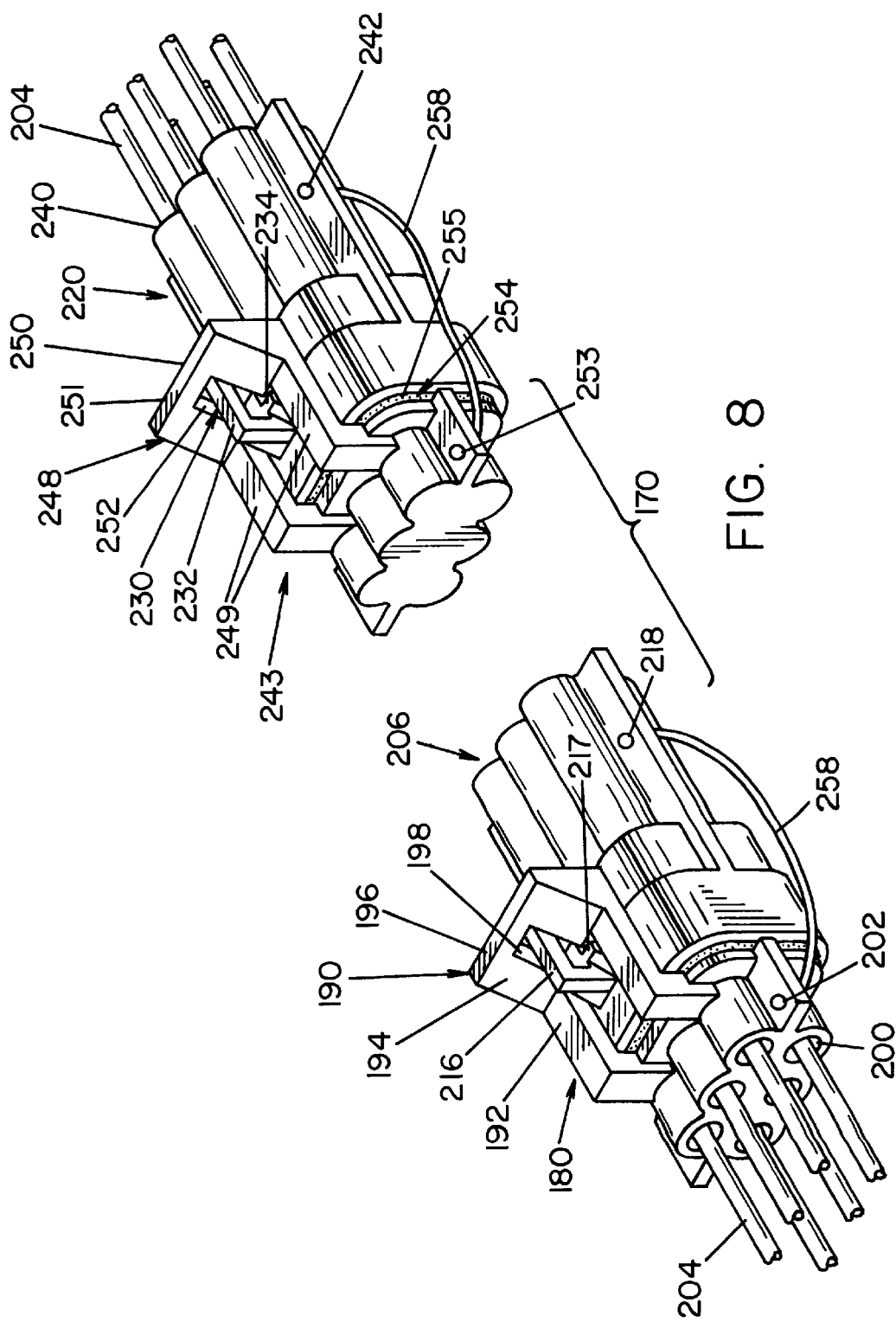
FIG. 8 illustrates the connectors in FIG. 7 in a sealed arrangement.

Referring now to FIG. 8, when male connector housing 180 is removed from female connector housing 220, such as when auxiliary light 30 is disconnected from the auxiliary light harness, the connectors at one end of the auxiliary light harness and at one end of the auxiliary light can be sealed so as to prevent the electrical connectors from becoming damaged while unconnected. FIG. 8 illustrates male connector housing 180 and female connector housing 220 being sealed by male seal connector 206 and female seal connector 243, respectively. Male seal connector 206 is designed so as to connect to and secure to male connector housing 180 in a similar fashion as female connector housing 220 would connect to male connector housing 180. Similarly, female seal connector 243 connects to female connector housing 220 in a similar fashion as male connector housing 180 would connect to female connector housing 220. When male seal connector 206 is connected to male connector housing 180, seal 210 on male connector housing 180 forms a seal between the interior of connector cavity 208 of male seal connector 206 and neck portion 182 of male connector housing 180. This seal inhibits and/or prevents liquids and/or other materials from damaging conductor sockets 184 from becoming corroded or otherwise damaged. Female seal connector 243 includes a seal 254 to thereby form a seal between neck portion 244 of female seal connector 243 and the inner surface of conductor cavity 222 of female connector housing 220 when female seal connector 243 is connected with female connector housing 220. This seal inhibits and/or prevents liquids and/or other materials from damaging the conducting pins 226 within female conductor housing 220 as long as female seal connector 243 is connected to female connector housing 220. Both male seal connector 206 and female seal connector 243 can easily be removed from male connector housing 180 and female connector housing 220, respectively, to once again allow male connector 180 to be connected to female connector housing 220.

Figure 9:
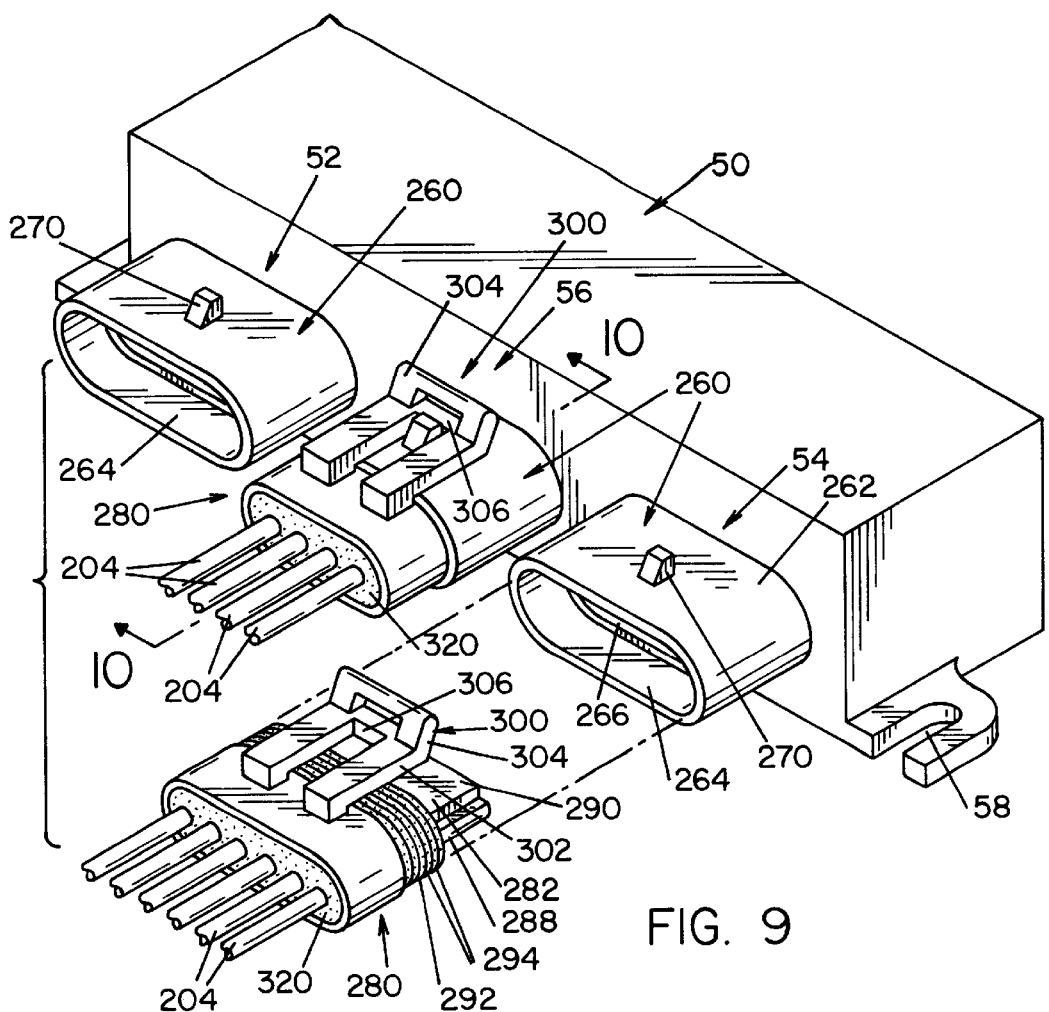
FIG. 9 is a front elevation view of the connectors to a circuit.
Figure 10:
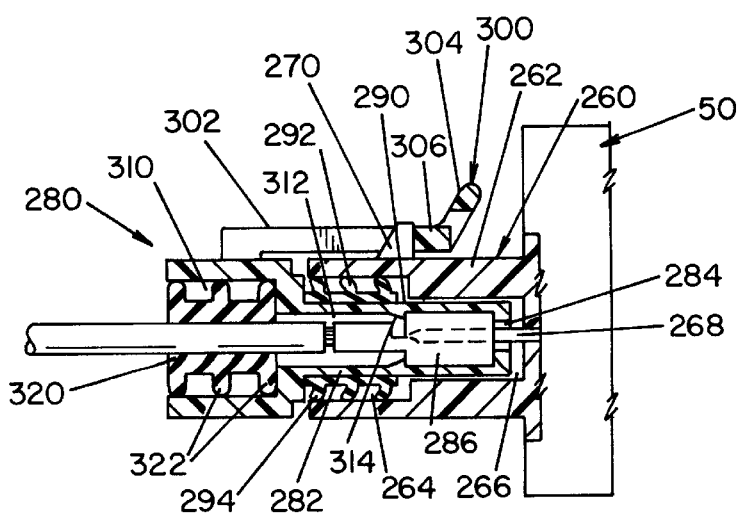
FIG. 10 is a cross sectional view along line 10—10 of FIG. 9.

Referring now to FIGS. 9 and 10, a seal arrangement is also provided for the electrical connection between control module 50 and harness headlight wiring connectors 62, 64 and 66. Control module 50 includes three module port seal connectors 260. Module port seal connectors 260 are designed to telescopically receive a port male connector 280. These port connectors are connected to the ends of harness headlight wiring connectors 62, 64 and 66. Each module port seal connector 260 includes a module casing 262 which is preferably made of a rigid material such as a hard plastic, metal, rubber, fiberglass and the like.

Module casing 262 includes a casing cavity 264. Within casing cavity 264 is a positioning cavity 266. Within casing cavity 264 is also a plurality of conductor pins 268. A lock tab 270 is positioned on the top of module casing 262.

Each port male connector 280 includes a neck portion 282. At the front of neck portion 282 is a plurality of neck openings 284. Positioned within each neck opening 284 is a conductor socket 286. On the outer surface of neck portion 282 is provided a neck ridge 288. Neck ridge 288 is designed to create a specific cross sectional shape of neck portion 282 such that port male connector 280 can only fit in casing cavity 264 and positioning cavity 266 in a specific manner so as to ensure the proper connection of port male connector 280 within modular port seal connector 260.

Neck portion 282 also includes a seal surface 290. Positioned on seal surface 290 is a cavity seal 292. Cavity seal 292 includes a plurality of seal ribs 294 Cavity seal 292 is preferably made of a flexible material such as a flexible plastic, rubber or the like to allow seal ribs 294 to compress and/or flex when port male connector 280 is inserted into modular port seal connector 260.

Positioned on the top of port male connector 280 is a lock latch 300. Lock latch 300 includes two flexible latch arms 302 and a latch handle 304 connected therebetween. Latch handle 304 includes a latch bar 306.

Positioned at the rear of port male connector 280 is a connector rear cavity 310. Positioned in connector rear cavity 310 is a socket cavity 312. The socket lock cavity 314 is provided to secure conductor sockets 286 within socket cavity 312. Extending from connector rear cavity 310 is a plurality of wires 204 which are secured at one end to conductor sockets 286. Wire 204 is sealed within socket cavity 312 by a cavity seal 320. Cavity seal 320 includes a plurality of seal ribs 322. Cavity seal 320 is preferably made of a material similar to the material of cavity seal 292.

As best shown in FIG. 10, when port male connector 280 is telescopically received within modular casing 262 of modular port seal connector 260, conductor sockets 286 in port male connector 280 engage the conductor pins 268 within modular casing 262 thereby providing a electrical connection between wire 204 and the electrical circuitry within control module 50. When port male connector 280 is fully inserted into modular port seal connector 260, latch bar 306 on latch handle 304 engages lock tab 270 thereby securing or locking together port male connector 280 to male port seal connector 260. Cavity seal 320 and seal 292 inhibit and/or prevent liquid, dust, dirt and the like from contacting conductor sockets 286 and conducting pins 268 thereby ensuring the longevity of the electrical connection. When port male connector 280 is to be removed from modular port seal connector 260, latch handle 304 is lifted to thereby unlock latch bar 306 from lock tab 270 to allow port male connector 280 to be removed from port seal connector 260.

The invention has been described with reference to preferred and alternate embodiments. Modifications and alterations will become apparent to those skilled in the art upon reading and understanding the detailed discussion of the invention provided for herein. This invention is intended to include all such modifications and alterations insofar as they come within the scope of the present invention.

Having thus described the invention, it is claimed:

1. A light circuit for connecting a plurality of auxiliary lights to a vehicle headlight system wherein said vehicle headlight system includes a first and second headlight and a first and second headlight plug which supplies power to said headlights, said light circuit comprising:

a) a first headlight connector to replace said first headlight plug and to connect to said first headlight;

b) a first power connector to connect to said first headlight plug;

c) a second headlight connector to replace said second headlight plug and to connect to said second headlight;

d) a second power connector to connect to said second headlight plug;

e) a first auxiliary light connector to connect to a first auxiliary light;

f) a switch to control power to said first headlight and said first auxiliary light; and g) at least one control module connected between the switch and at least one headlight and at least one auxiliary light, said control module designed to direct power to a light source upon receiving an electric signal from said switch, said light source including a light selected from the group consisting of at least one headlight and at least one of said auxiliary light.

2. A light circuit as defined in claim 1, including a second auxiliary light connector adapted to connect to a second auxiliary light, and said switch controlling power to said first and second headlights and said first and second auxiliary lights.

3. A light circuit as defined in claim 2, including two control modules connected between said switch and said two headlights and said two auxiliary lights, said two control modules designed to direct power to a light source upon receiving an electric signal from said switch, said light source including a light selected from the group consisting of said headlights and said auxiliary lights.

4. A light circuit as defined in claim 1, wherein one end of said first headlight connector is connected to said first headlight and a second end of said first headlight connector is connected to said at least one control module, said second end easily attachable and detachable from said at least one control module.

5. A light circuit as defined in claim 3, wherein one end of said first headlight connector is connected to said first headlight and a second end of said first headlight connector is connected to said at least one control module, said second end easily attachable and detachable from said at least one control module.

6. A light circuit as defined in claim 1, wherein one end of said first power connector is connected to said first headlight plug and a second end of said first power connector is connected to said at least one control module, said second end easily attachable and detachable from said at least one control module.

7. A light circuit as defined in claim 5, wherein one end of said first power connector is connected to said first headlight plug and a second end of said first power connector is connected to said at least one control module, said second end easily attachable and detachable from said at least one control module.

8. A light circuit as defined in claim 1, wherein one end of said auxiliary light connector is connected to said first auxiliary light and a second end of said auxiliary light connector is connected to said at least one control module, said second end easily attachable and detachable from said at least one control module.

9. A light circuit as defined in claim 7, wherein one end of said auxiliary light connector is connected to said first auxiliary light and a second end of said auxiliary light connector is connected to said at least one control module, said second end easily attachable and detachable from said at least one control module.

10. A light circuit as defined in claim 1, wherein said switch is easily attachable and detachable from said at least one control module.

11. A light circuit as defined in claim 9, wherein said switch is easily attachable and detachable from said at least one control module.

12. A light circuit as defined in claim 1, including a turn signal connector to connect to a turn signal light of said vehicle, said turn signal connector connected to at least one of said control modules.

13. A light circuit as defined in claim 11, including a turn signal connector to connect to a turn signal light of said vehicle, said turn signal connector connected to at least one of said control modules.

14. A light circuit as defined in claim 13, wherein said turn signal connector is electrically connected by a splice to said turn signal light.

15. A light circuit as defined in claim 1, wherein said switch is a two pole two position switch.

16. A light circuit as defined in claim 14, wherein said switch is a two pole two position switch.

17. A light circuit for connecting an auxiliary light to a vehicle headlight system wherein said vehicle headlight system includes a headlight and a headlight plug which supplies power to said headlight, said light circuit comprising:

a) a headlight connector designed to replace said headlight plug and to connect to said headlight;

b) a power connector designed to connect to said headlight plug;

c) an auxiliary light connector designed to connect to an auxiliary light;

d) a light selection switch designed to create an electrical signal indicating selection of said auxiliary light and/or said headlight, said switch connected to a power circuit other than from said headlight plug; and e) a control module to direct power to a light source upon detection of a signal from said switch, .

18. A light circuit as defined in claim 17, wherein one end of said headlight connector is connected to said headlight and a second end of said headlight connector is connected to said control module, said second end easily attachable and detachable from said control module.

19. A light circuit as defined in claim 17, wherein one end of said power connector is connected to said headlight plug and a second end of said power connector is connected to said control module, said second end easily attachable and detachable from said control module.

20. A light circuit as defined in claim 17, wherein one end of said auxiliary light connector is connected to said auxiliary light and a second end of said auxiliary light connector is connected to said control module, said second end easily attachable and detachable from said control module.

21. A light circuit as defined in claim 17, wherein said switch is easily attachable and detachable from said control module.

22. A light circuit as defined in claim 17, including a turn signal connector to connect to a turn signal light of said vehicle, said turn signal connector connected to said control module.

23. A light circuit as defined in claim 17, wherein said control module includes a sealing arrangement to inhibit interference with electrical signals selected from the group consisting of signals to said control module, signals from said control module, and combinations thereof.

24. A light circuit as defined in claim 23, wherein said sealing arrangement includes a flexible seal.

25. A light circuit as defined in claim 1, wherein said switch connected to a power circuit other than from said headlight plug.

26. A light circuit as defined in claim 16, wherein said switch connected to a power circuit other than from said headlight plug.

27. A light circuit as defined in claim 1, wherein said control module includes a sealing arrangement to inhibit interference with electrical signals selected from the group consisting of signals to said control module, signals from said control module, and combinations thereof.

28. A light circuit as defined in claim 26, wherein said control module includes a sealing arrangement to inhibit interference with electrical signals selected from the group consisting of signals to said control module, signals from said control module, and combinations thereof.

29. A light circuit as defined in claim 27, wherein said sealing arrangement includes a flexible seal.

30. A light circuit as defined in claim 28, wherein said sealing arrangement includes a flexible seal.

31. A light circuit as defined in claim 27, wherein said sealing arrangement includes a male connector, a female connector and a flexible seal, said flexible seal positioned at least partially between said male and female connector when said male connector is inserted into said female connector.

32. A light circuit as defined in claim 30, wherein said sealing arrangement includes a male connector, a female connector and a flexible seal, said flexible seal positioned at least partially between said male and female connector when said male connector is inserted into said female connector.

33. A light circuit as defined in claim 27, wherein said female connector includes a housing to at least partially telescopically receive a portion of said male connector.

34. A light circuit as defined in claim 32, wherein said female connector includes a housing to at least partially telescopically receive a portion of said male connector.

35. A light circuit as defined in claim 27, wherein said flexible seal is positioned on said male connector, said flexible seal substantially surrounding an outer surface of said male connector.

36. A light circuit as defined in claim 34, wherein said flexible seal is positioned on said male connector, said flexible seal substantially surrounding an outer surface of said male connector.

37. A light circuit as defined in claim 27, wherein said male and female connectors include a locking arrangement to secure together said male and female connectors.

38. A light circuit as defined in claim 36, wherein said male and female connectors include a locking arrangement to secure together said male and female connectors.

39. A light circuit as defined in claim 27, wherein said flexible seal includes at least one corrugation.

40. A light circuit as defined in claim 26, wherein said flexible seal includes at least one corrugation.

41. A light circuit as defined in claim 26, wherein said sealing arrangement includes a male connector, a female connector and a flexible seal, said flexible seal positioned at least partially between said male and female connector when said male connector is inserted into said female connector.

42. A light circuit as defined in claim 41, wherein said female connector includes a housing to at least partially telescopically receive a portion of said male connector.

43. A light circuit as defined in claim 41, wherein said flexible seal is positioned on said male connector, said flexible seal substantially surrounding an outer surface of said male connector.

44. A light circuit as defined in claim 41, wherein said male and female connectors include a locking arrangement to secure together said male and female connectors.

45. A light circuit as defined in claim 24, wherein said flexible seal includes at least one corrugation.

* * * * *